Oct. 23, 1945.  F. R. HARRIS  2,387,509
CHAIN CLAMP
Filed Jan. 10, 1944
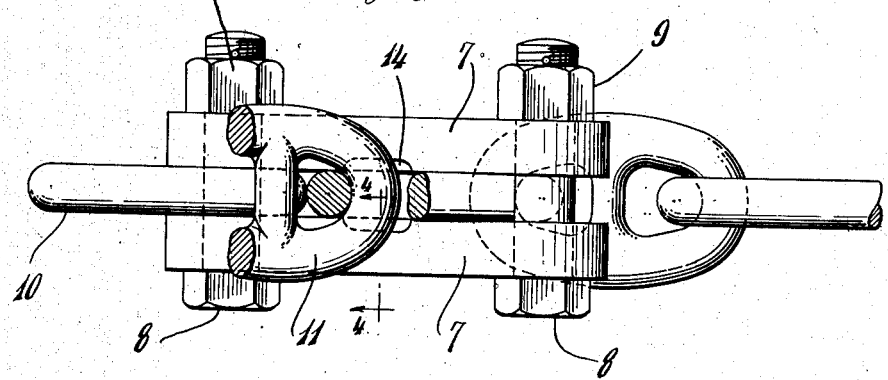
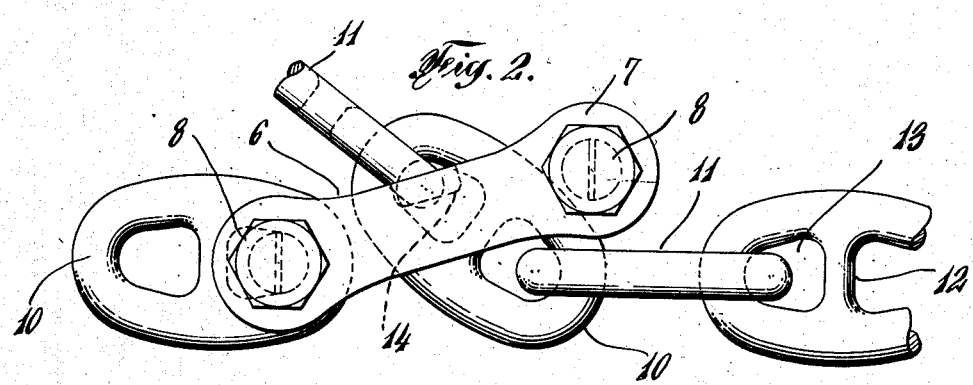
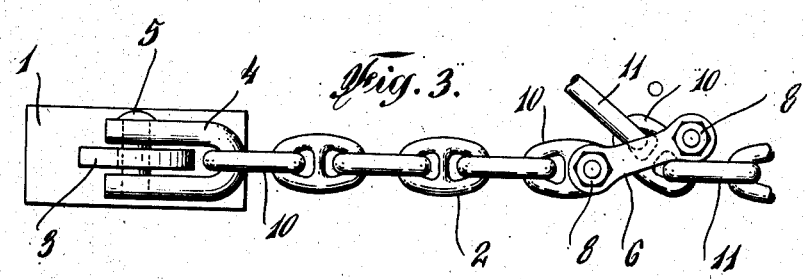
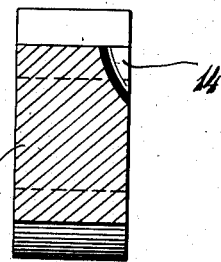
INVENTOR.
Frederic R. Harris
BY
William F. Nickel
ATTORNEY Patented Oct. 23, 1945

2,387,509

UNITED STATES PATENT OFFICE 2,387,509
CHAIN CLAMP

Frederic R. Harris, New York, N. Y.

Application January 10, 1944, Serial No. 517,742

2 Claims. (Cl. 24—116)

This invention relates to improvements in clamps for chains; and more particularly to a clamp for uniting the ends of two lengths or pieces of chain and permitting adjustment by letting out one or more links; or taking up on the chains, when necessary, to eliminate slackness therein.

An object of the invention is to provide a clamp which has sufficient strength to splice a chain securely, and is adapted to be readily and easily connected to the chain and disconnected therefrom.

On the drawing, which illustrates a preferred embodiment of the invention:

Figure 1 is a top view of the clamp in operative position.

Figure 2 is a side elevation thereof.

Figure 3 shows two pieces of chain spliced by the clamp and the shackle for the chain at one end; and Figure 4 is a section through the middle of one-half of the clamp taken on the line 4—4 of Fig. 1.

The same numerals identify the same parts throughout.

The numeral 1 indicates a fixture, such as a mooring pad, to be affixed to the deck of a ship or floating dry dock, for example; and 2, a length of chain such as the chain for anchoring or otherwise mooring the vessel. The mooring pad has an upright lug or bearing 3, to which a shackle 4 is attached by a bolt or rivet 5. The clamp 6 for the chain includes a pair of links 7, with perforated ends for bolts 8 and nuts 9. The two lengths of chain comprise links 10 and links 11 at right angles to the links 10.

The clamp is attached by bolting one end to a link at the end of one part of the chain, such as the link 10 at the left end of the clamp in the drawing; and fastening between the two members or halves of the clamp a link such as the link 10, adjacent the end of the complementary length of chain, and in the same plane as the first link, but united at both its ends to links 11 in planes at right angles thereto. Said link 10 on the complementary length of chain is thus gripped between the halves of the clamp; and the outer link 11 connected with this link 10, which lies crosswise of the clamp, then serves as a stop and prevents disengagement of the chain. All of the chain links are heavy, with a central cross bar 12 dividing the opening into apertures 13 which are large enough for the links, but leave no room for the bolts 8, except in the case of the outer or terminal links 10 of each piece. Assuming that all the links engaged by the clamp, such as the links 10, are substantially in the same plane, the two lengths of chain can thus be spliced without twisting either, and thus torsional stresses, in addition to tension, can be avoided. Also, in the event that either chain is so hung that certain links 10 and 11 to be joined on each length lie about in the same plane, then the two lengths of chain can be united by passing the bolts 8 directly through the two end links 10 and 11. This feature of the invention is an important one; and makes handling easy. Torsion can be avoided, as above set forth; or with heavy chains, or under circumstances when a quick connection is necessary, the clamp can be rapidly attached to the ends as they happen to be presented; either with the links in the positions shown on the drawings, or with the end link 11 of the chain at the right, in the same plane as the link 10 bolted directly to the extremity of the clamp at the left.

The two clamp members 7 have recesses 14 on their inner faces near one edge to fit snugly against the end of the free link 11 attached to the link 10 engaged by the clamp.

The invention is especially useful for vessels moored side by side, or in other positions, when the station must be maintained by taking up on the chains, or letting them out, without casting off at either the ends joined to the vessel or the fixed point of anchorage or mooring near to it. Under such conditions the chains are shortened or lengthened from the deck.

While I have described a specific form of clamp, I, of course, reserve the right to make any changes in details that fall within the scope and spirit of the invention.

Having described my invention, what I believe to be new is:

1. A chain splicing clamp comprising a pair of members disposed side by side, a bolt and nut at one end of said members to attach the latter to a chain link with one end of said link between said members, and a bolt and nut at the opposite ends of the latter to hold them together, embracing the mid-portion of another link between them, said other link being in the same plane as the first-named link, said members having recesses on their inner faces to receive and abut an additional link united to said other and disconnected from the first-named link.

2. A chain splicing clamp comprising a pair of members disposed side by side, a bolt and nut at one end of said members to attach the latter to a chain link with one end of said link between said members, and a bolt and nut at the opposite ends of the latter to hold them together, embracing the mid-portion of another link between them, said other link being in the same plane as the first-named link, said members having recesses on their inner faces to receive and abut an additional link united to said other and disconnected from the first-named link, said additional link being substantially at right angles to the other two.

FREDERIC R. HARRIS.